US008165950B2

(12) United States Patent
Lundberg et al.

(10) Patent No.: US 8,165,950 B2
(45) Date of Patent: Apr. 24, 2012

(54) METHOD AND A SYSTEM FOR TRADING STRIPPED BONDS

(75) Inventors: Jonas Lundberg, Stockholm (SE); Daniel Negishi, Stockholm (SE)

(73) Assignee: OMX Technology AB, Stockholm (SE)

( * ) Notice: Subject to any disclaimer, the term of this patent is extended or adjusted under 35 U.S.C. 154(b) by 2486 days.

(21) Appl. No.: 10/616,224

(22) Filed: Jul. 10, 2003

(65) Prior Publication Data

US 2005/0010519 A1 Jan. 13, 2005

(51) Int. Cl.
*G06Q 40/00* (2012.01)

(52) U.S. Cl. .............................. 705/37; 705/36 R; 705/35

(58) Field of Classification Search .................... 705/36, 705/37, 35, 38, 1, 4, 40; 364/498, 401, 200, 364/900
See application file for complete search history.

(56) References Cited

U.S. PATENT DOCUMENTS

| | | | | |
|---|---|---|---|---|
| 4,648,038 | A * | 3/1987 | Roberts et al. | 705/36 R |
| 5,946,667 | A | 8/1999 | Tull, Jr. et al. | |
| 6,035,287 | A | 3/2000 | Stallaert et al. | |
| 6,304,858 | B1 * | 10/2001 | Mosler et al. | 705/37 |
| 7,039,610 | B2 * | 5/2006 | Morano et al. | 705/37 |
| 7,177,833 | B1 | 2/2007 | Marynowski et al. | |
| 7,246,093 | B1 * | 7/2007 | Katz | 705/37 |
| 7,890,411 | B2 * | 2/2011 | Moore et al. | 705/37 |
| 2002/0026399 | A1 * | 2/2002 | Narayan et al. | 705/37 |
| 2002/0035532 | A1 * | 3/2002 | Halpern | 705/36 |
| 2002/0194115 | A1 | 12/2002 | Nordlicht et al. | |
| 2003/0225684 | A1 * | 12/2003 | Gustafson | 705/37 |
| 2003/0235684 | A1 * | 12/2003 | Ogle | 428/304.4 |

FOREIGN PATENT DOCUMENTS

| | | |
|---|---|---|
| WO | WO 00/75839 | 12/2000 |
| WO | WO 01/42971 | 6/2001 |
| WO | WO 02/69112 | 9/2002 |

OTHER PUBLICATIONS

The pricing of default-free interest rate cap, floor, and collar agreements.Briys, Eric; Crouhy, Michel; Schobel, Rainer Journal of Finance , v46 , n5 , p. 1879(14) Dec. 1991 ISSN: 0022-1082.*
Stalking the LYONs. (Liquid Yield Option Notes) Sachar, Laura Financial World , v157 , n3 , p. 48(2) Jan. 26, 1988 CODEN: FIWOA ISSN: 0015-2064.*
Interpreting SIGNs Finnerty, John D Financial Management v22 n2 pp. 34-47 Summer 1993 ISSN: 0046-3892 Journal Code: FMG Word Count: 8446 Line Count: 768 Accounting & Tax DB__1971-2011/Mar W1.*
Translation of Japanese official action, Nov. 6, 2009, in corresponding Japanese Application No. 2006-518210.
Jordan et al., *The Relative Pricing of U.S. Treasury Strips: Empirical Evidence*, Journal of Financial Economics 56 (2000), pp. 89-123.

* cited by examiner

*Primary Examiner* — Alexander Kalinowski
*Assistant Examiner* — Abhishek Vyas
(74) *Attorney, Agent, or Firm* — Nixon & Vanderhye P.C.

(57) ABSTRACT

In an automated trading system for matching bids and offers entered into the system by a number of traders connected to the system, a server hosts a matching processor and an associated memory forming an orderbook of the system where both fixed-income instruments paying a coupon, referred to as bonds, and fixed-income instruments not paying a coupon (zero-coupon), referred to as stripped bonds, are traded. The system derives prices for bonds using information from stripped bonds.

7 Claims, 10 Drawing Sheets

METHOD AND A SYSTEM FOR TRADING STRIPPED BONDS

TECHNICAL FIELD

The present invention relates to an automated exchange system, and in particular to an automated exchange designed to trade bonds including so-called stripped bonds (STRIPS).

BACKGROUND

A bond is a written unconditional promise to pay a specific principal sum at a determined future date, and interest at a fixed or determinable rate on fixed dates. Bonds are issued by governments to finance their budget, but also by other entities having a high credibility such as banks and large companies. Thus, a bond is a debt instrument meaning that it is a loan payable to the holder of the bond for some fixed amount known as the bond's face value. Attached to the bond is a so-called coupon. Named for its historical similarity to actual coupons you would clip for grocery shopping, the coupon is usually a fixed interest payment made to the bondholders semi-annually or some other periodicity.

Bonds can also be bought and sold on the secondary market at current market prices; in that case you get interest for as long as you own the bond. Bonds are conventionally traded either manually, e.g. over the phone or using an automated matching system.

In addition to conventional bonds, there also exists a market for so-called stripped bonds. A stripped bond is a bond that can be subdivided into a series of zero-coupon bonds. The only difference between a strip bond and a regular bond is that some financial institution removes the coupon payments and sells both the face value and the coupon payments separately. Thus, rather than receiving the face value of the bond plus coupons, a bondholder of a stripped bond will only receive the par value. The profit investors make from purchasing stripped bonds surface through the spread between the discounted purchase price and the maturing value.

When a Treasury fixed-principal or inflation-indexed note or bond is stripped, each interest payment and the principal payment becomes a separate zero-coupon security. Each component has its own identifying number and can be held or traded separately. For example, a Treasury note with 10 years remaining to maturity consists of a single principal payment at maturity and 20 coupon payments, one every six months for 10 years. When this note is converted to a stripped form, each of the 20 coupon payments and the principal payment becomes a separate security.

The Treasury does not normally issue or sell stripped bonds directly to investors. Thus, stripped bonds can normally be purchased and held only through financial institutions and government securities brokers and dealers.

Stripped bonds are traded with increased popularity among investors who want to receive a known payment at a specific future date. For example, some State lotteries invest the present value of large lottery prizes in stripped bonds to be sure that funds are available when needed to meet annual payment obligations that result from the prizes. Pension funds invest in stripped bonds to match the payment flows of their assets with those of their liabilities to make benefit payments. Stripped bonds are also popular investments for individual retirement accounts.

In the process of stripping a bond, a financial institution, government securities broker, or government securities dealer can convert an eligible Treasury security into interest and principal components through the commercial book-entry system. Generally, an eligible security can be stripped at any time from its issue date until its call or maturity date.

However, at present, the bond market and stripped bond market are two separate markets although the traders trading in the two markets are in general the same people. As a result, liquidity on the two markets suffers.

Also, since the same traders trade both in the conventional bond market and in the stripped bond market, those traders need to cover two markets simultaneously, which is difficult and is also associated with an additional risk.

SUMMARY

It is an object of the present invention to provide a method and a system wherein the bond market and the stripped bond market are linked to each other.

It is an additional object of the present invention to provide a trading system, which provides a single user interface for trading in the bond market and the stripped bond market.

It is yet another object of the present invention to provide a method and a system that supports generation of derived orders in a combined market for bonds and stripped bonds.

It is a further object of the present invention to provide a method and a system supporting combined orders in a market for bonds and stripped bonds.

These objects and others are obtained in a system and a method as set out in the appended claims.

An automated trading system is provided for matching bids and offers entered into the system by a number of traders connected to the system. The system preferably comprises a server hosting a matching processor and an associated memory forming an orderbook of the system and wherein both fixed-income instruments paying a coupon and fixed-income instruments not paying a coupon (zero-coupon) are traded. The system is additionally designed to derive prices for bonds using information from stripped bonds.

Using such a system it will be possible to make use of the relationship existing between a bond and a stripped bond to generate prices for a bond from a number of stripped bonds. In addition the system can use the relationship between bonds and stripped bonds to generate derived orders (baits) in the stripped bond market using the existing price on bonds. The linked markets of bonds and stripped bonds will create a more liquid market both for the bond market as well as the stripped bond market.

Furthermore the use of such a system will integrate the trading of bonds and stripped bonds into a common market place where the prices for stripped bonds are directly reflected in the pricing of bonds thereby creating more liquidity in the two markets. This in turn will eliminate any arbitrage pricing between the two markets. Moreover, a more user-friendly interface will be created.

DETAILED DESCRIPTION

Figure 1:
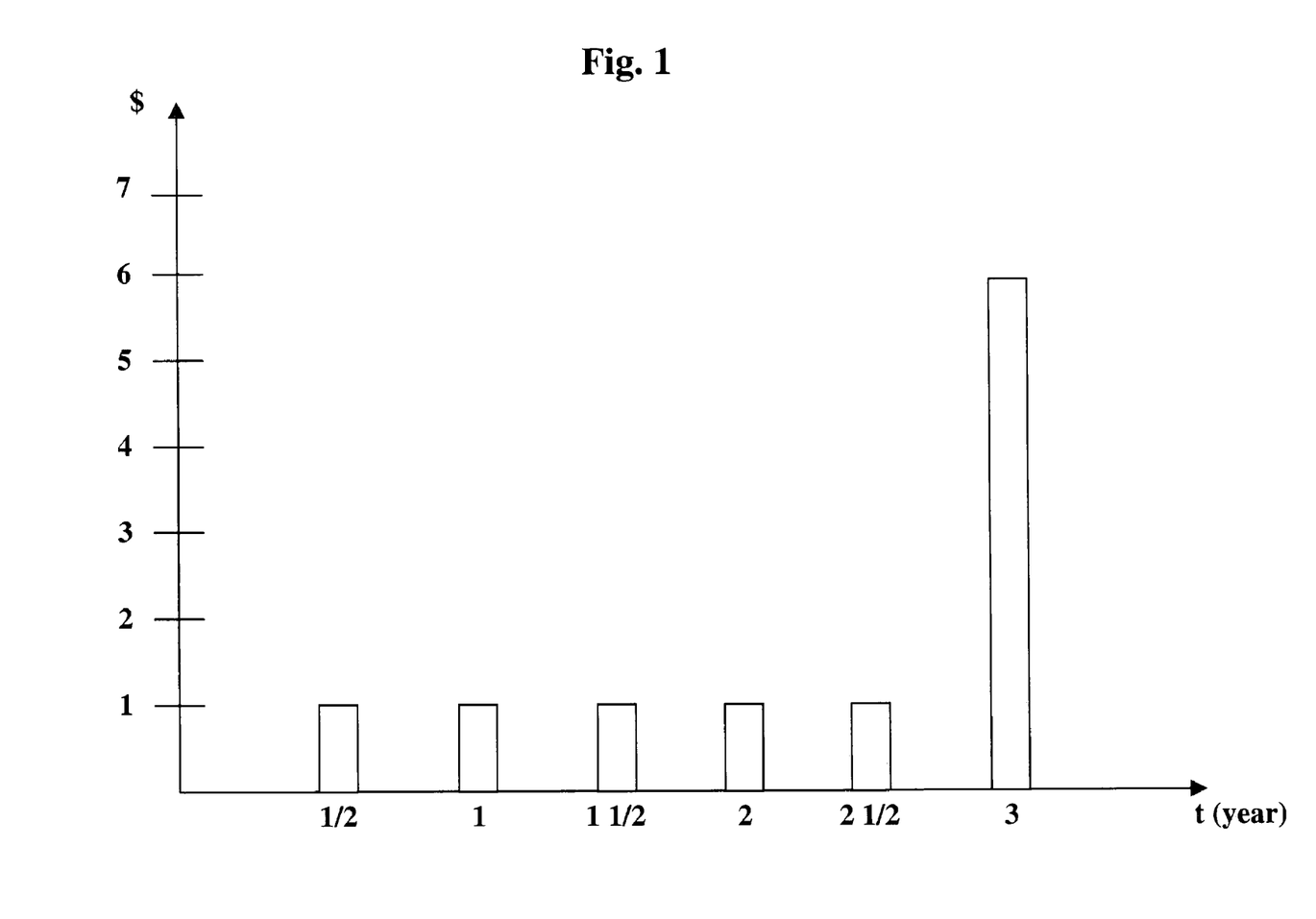
FIG. 1 illustrates payments for an imaginary bond.
Figure 2A:
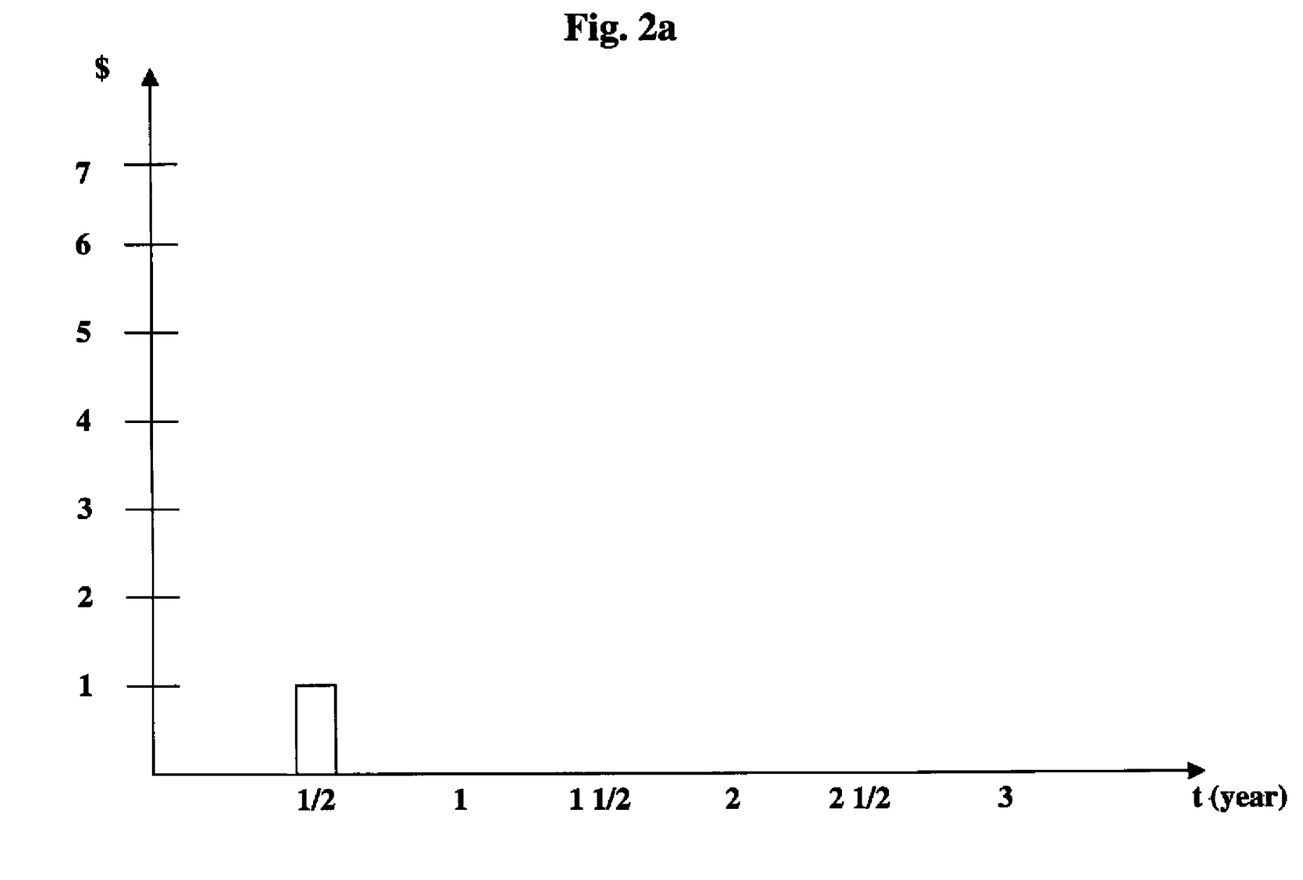
FIGS. 2a-2f illustrates a number of different imaginary stripped bonds.
Figure 2B:
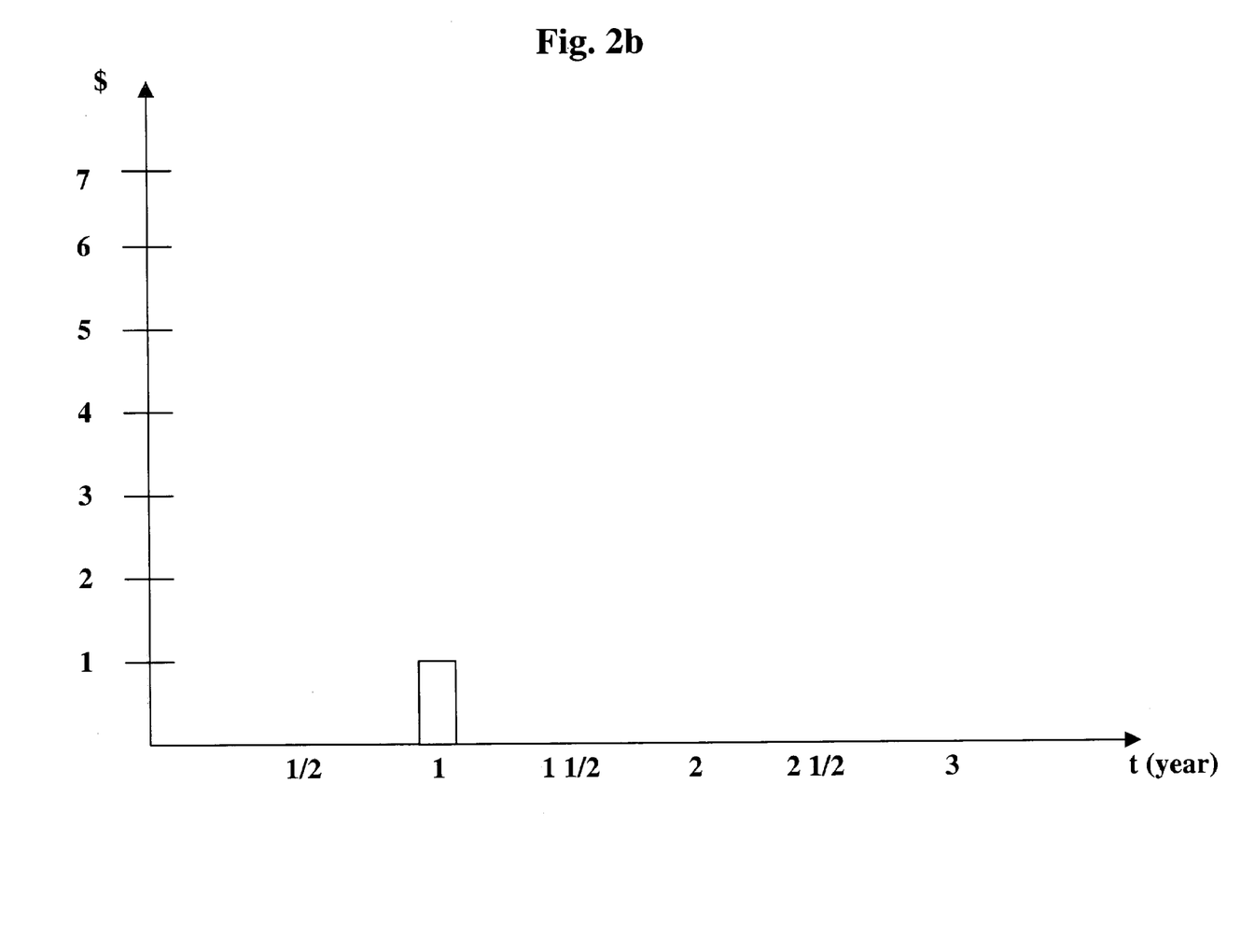
Figure 2C:
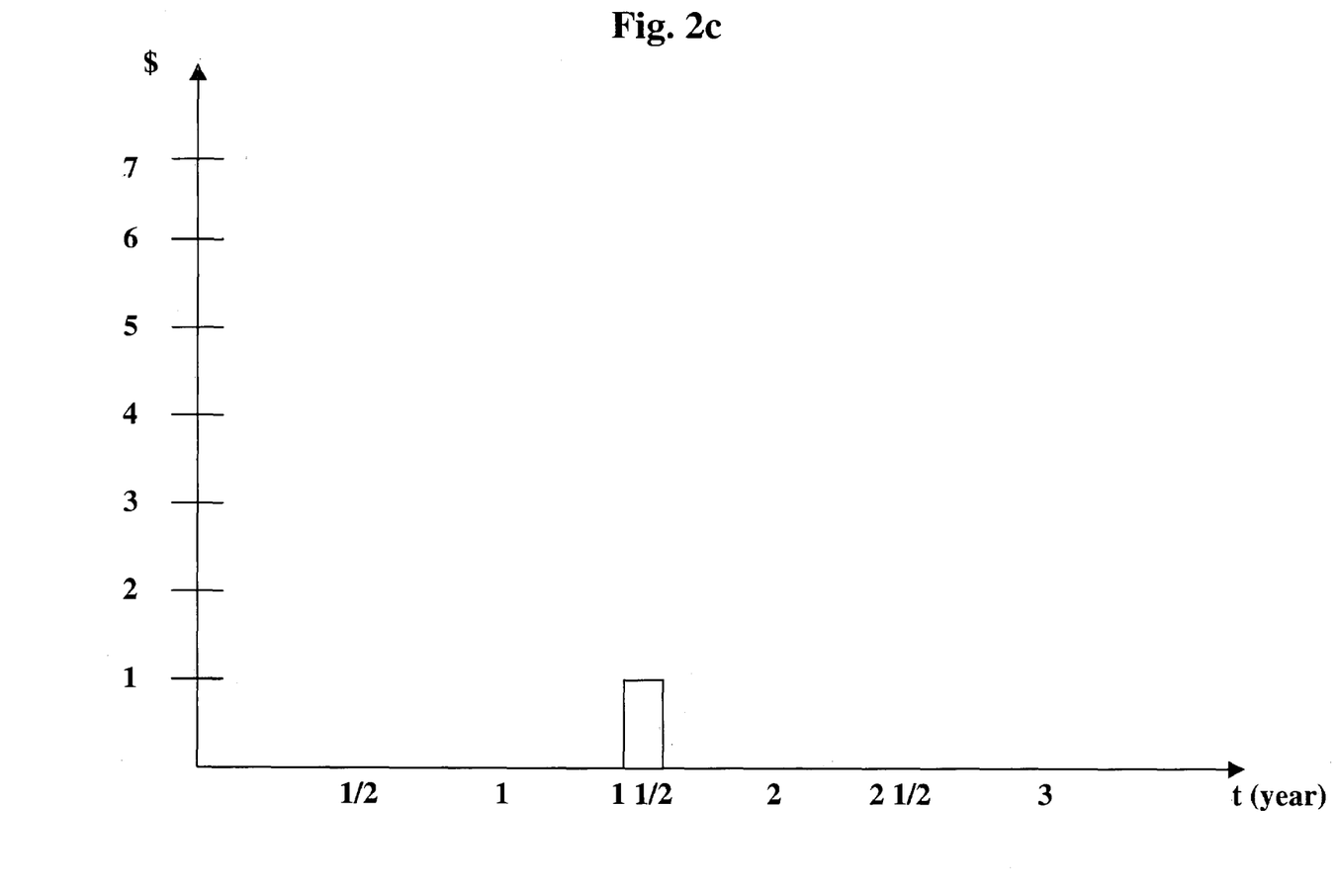
Figure 2D:
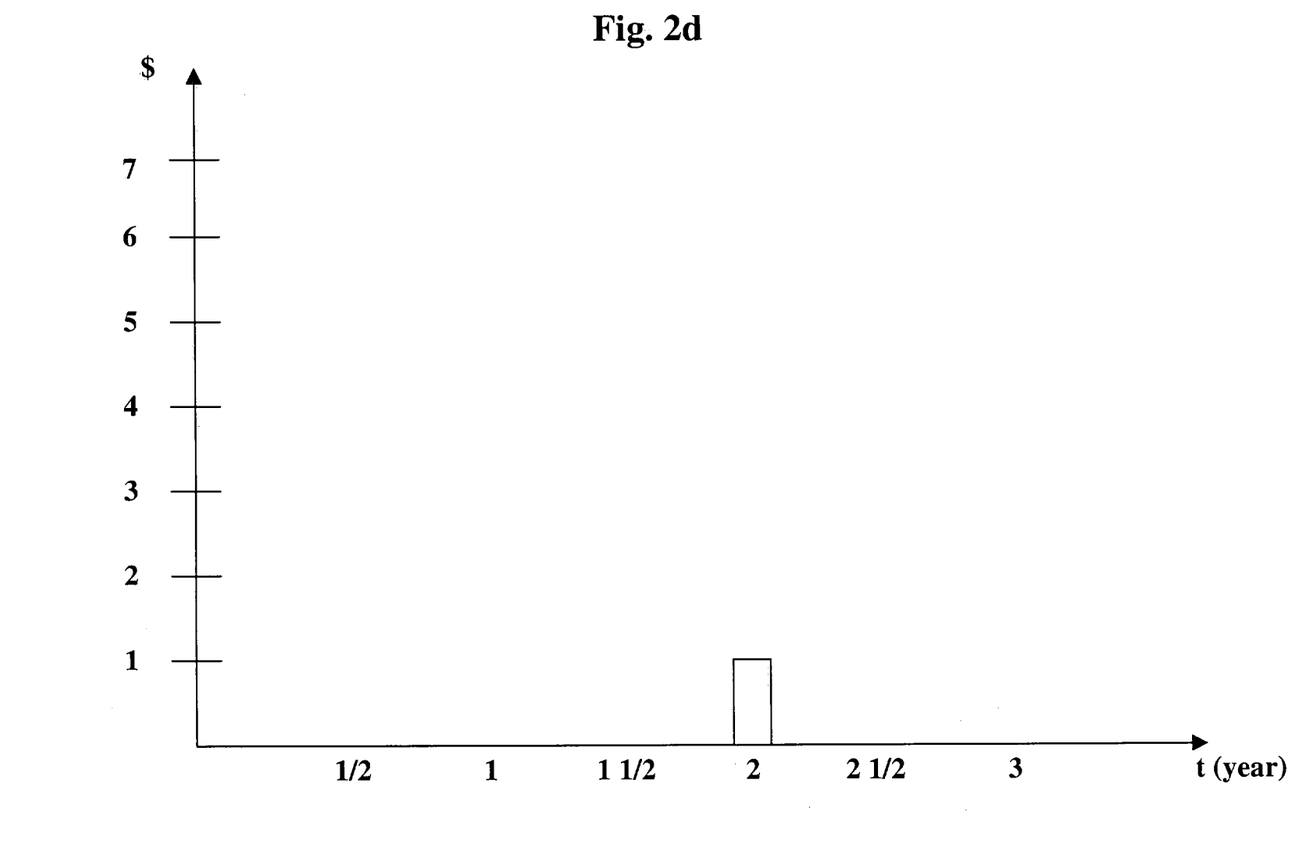
Figure 2E:
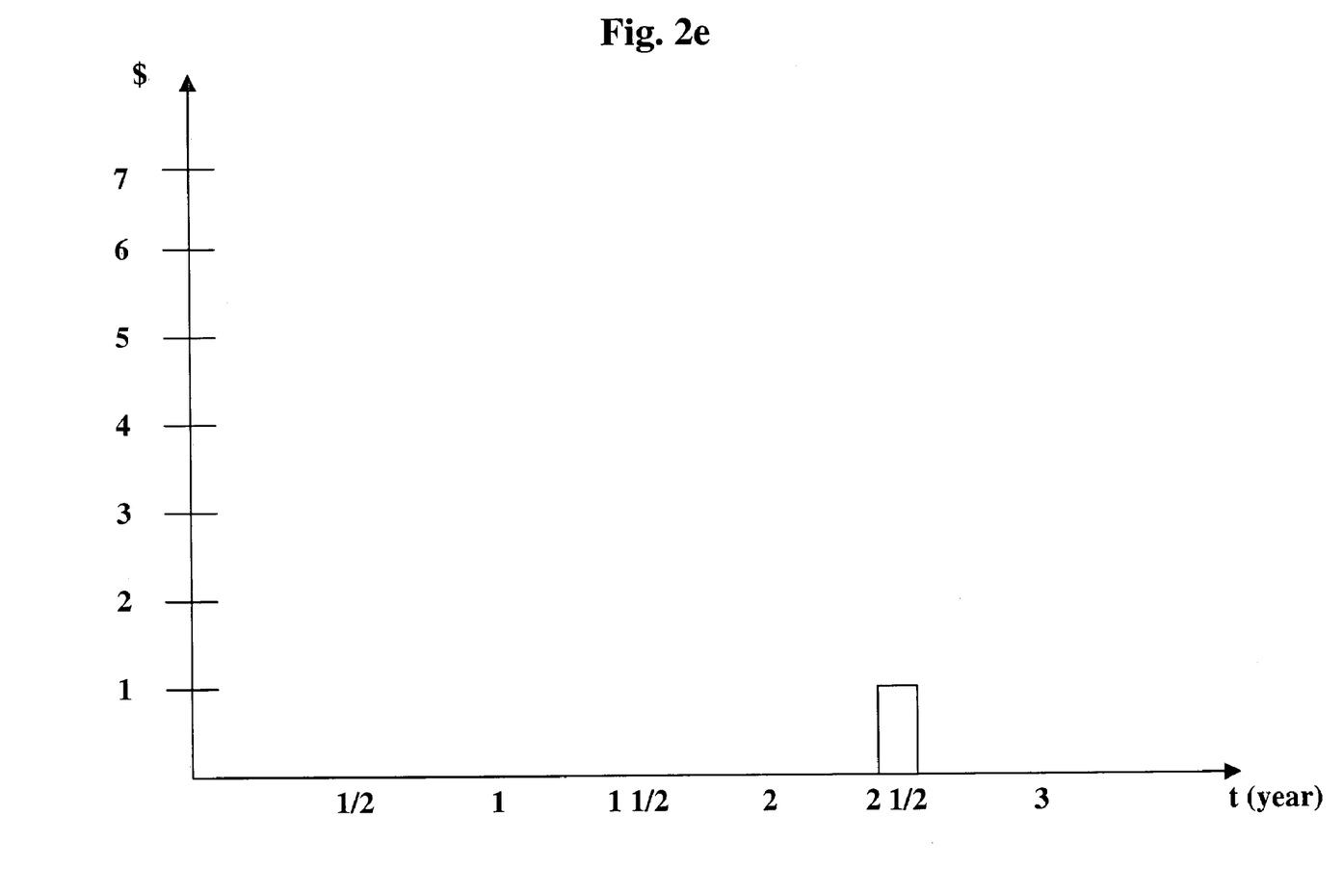
Figure 2F:
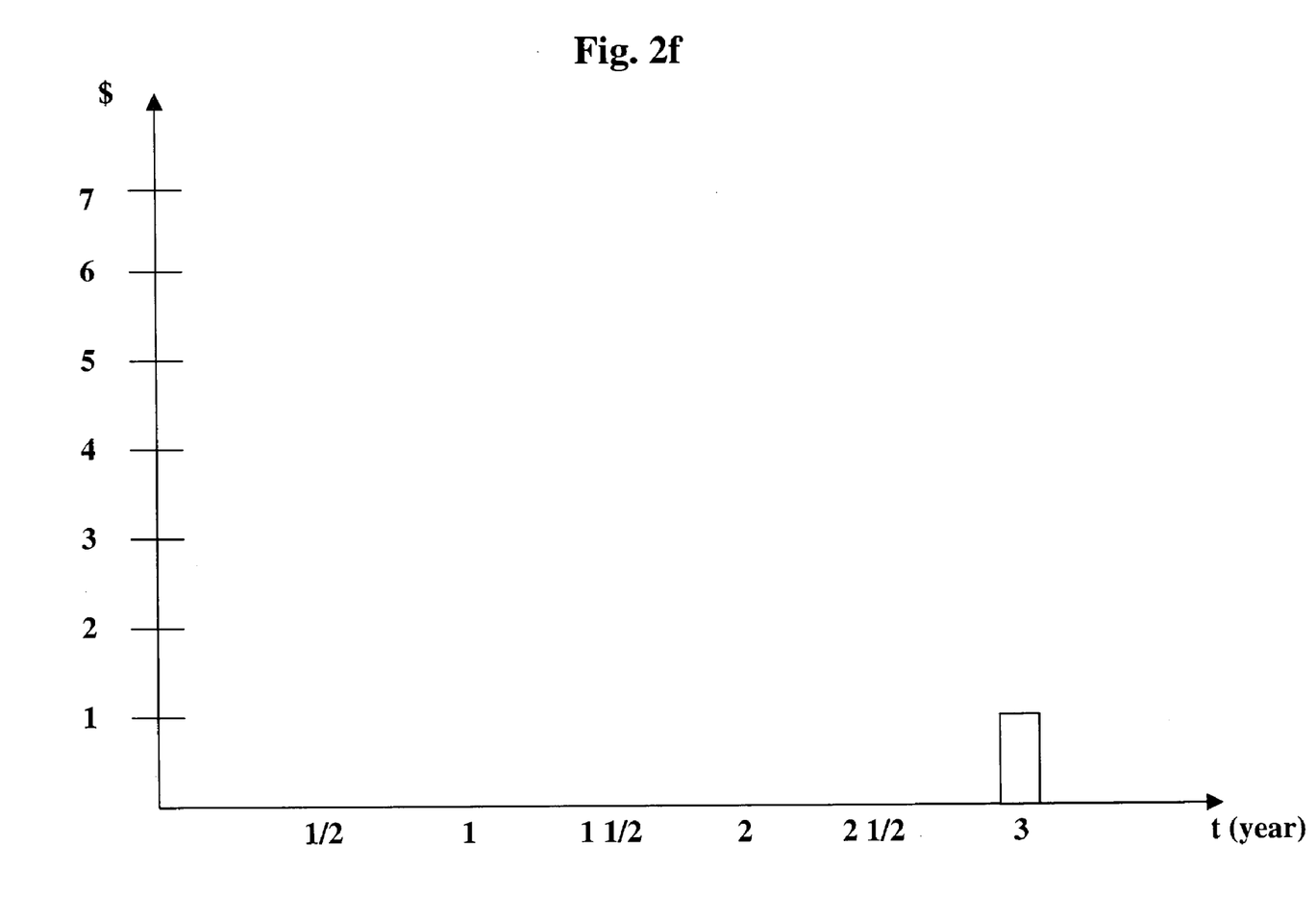

In FIG. 1, payments for an imaginary bond are illustrated. The bond payments as illustrated in FIG. 1 are only for purposes of illustration and are not intended to correspond to a real bond. Also, in this context the term "bond" is used for all fixed-income instruments paying a coupon, such as bonds, notes etc. The bond as depicted in FIG. 1 is a three-year bond having semi-annual coupon payments. Thus, the first coupon is paid after 6 months; the next coupon is paid after one year etc. The last coupon is paid after three years when the interest-earning amount, the face value, also is paid. This exemplary imaginary bond has a face value of $ 5 and pays a coupon of $ 1 semi-annually.

The bond depicted in FIG. 1 can be converted into a number of stripped bonds or zero-coupon bonds. The last payment for the bond depicted in FIG. 1 also pays the face value of that bond. The payments for these stripped bonds are depicted in FIGS. 2a-2f.

Figure 3:
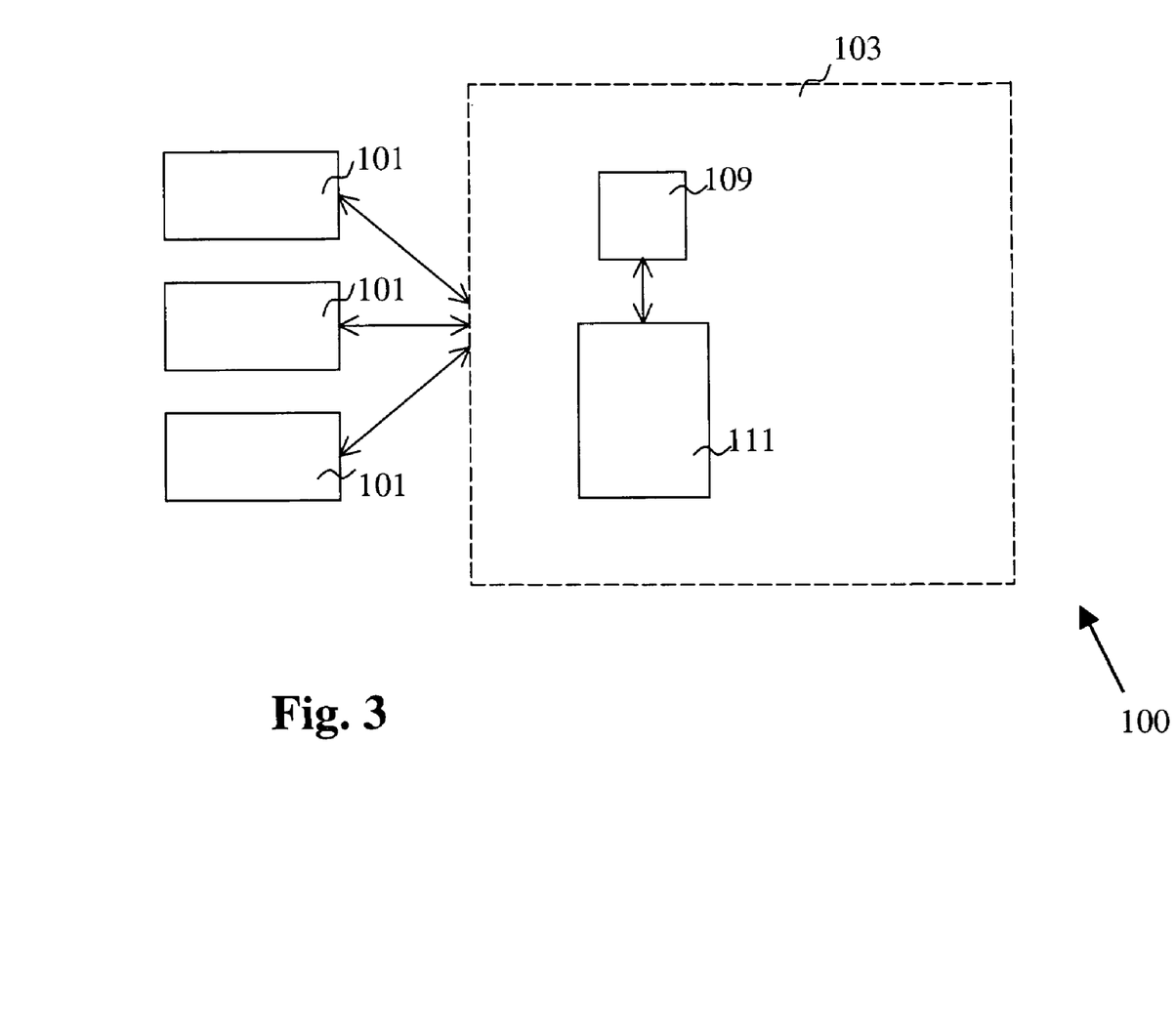
FIG. 3 is a view of an automated exchange system for combined trading of bonds and stripped bonds.

In FIG. 3, a general view of an automated exchange system 100 is shown. The system 100 provides a market for a number of different financial instruments and in particular fixed-income instruments including but not limited to bonds, notes, bills, stripped bonds, etc. The system comprises a number of remote terminals 101 all connected to a central computer server 103 comprising a matching unit 109 including a computer processor, and an order book (memory) 111 associated therewith. The central computer server 103 is loaded with suitable software, such as the CLICK TM software sold by OMX Technology AB, Sweden, and forms an automated exchange having all features and functionality of a conventional automated exchange. The remote terminals 101 are designed to send data to and receive data from the central computer server 103. The terminals 101 are further designed to provide an interface for investors, such as broker firms, etc., trading contracts including combination contracts at the automated exchange. The matching of orders input in such a system is performed in the central computer server by the matching unit 103 designed for this task.

The system of FIG. 3 is further designed to link the trading in bonds with trading in stripped bonds. Thus, the system will make use of the relationship existing between a bond and a stripped bond to generate prices for a bond from a number of stripped bonds. In addition the system can use the relationship between bonds and stripped bonds to generate derived orders (baits) in the stripped bond market using the existing price on bonds. The linked markets of bonds and stripped bonds will create a more liquid market both for the bond market as well as the stripped bond market.

Figure 4:
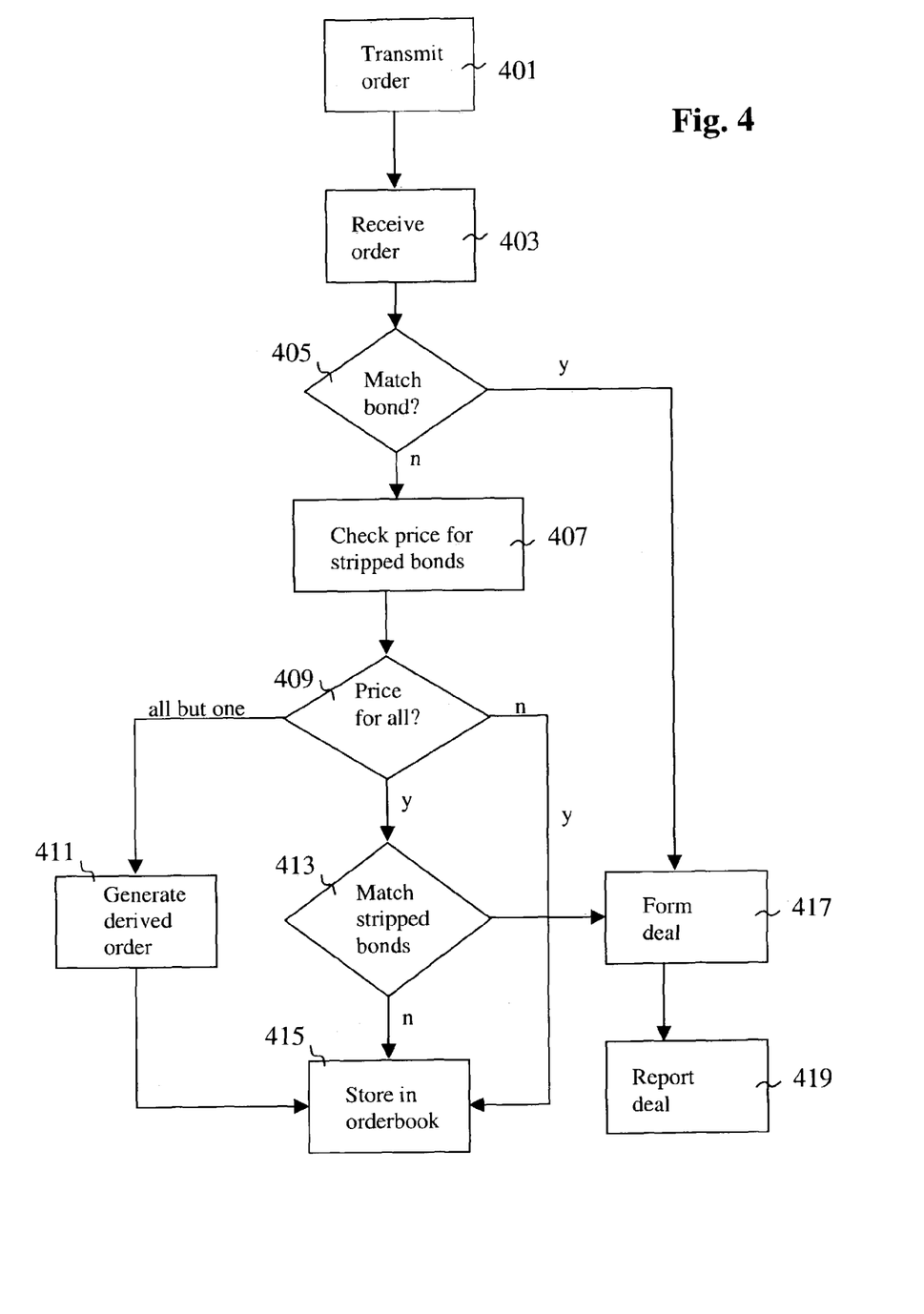
FIG. 4 is a flow chart illustrating different steps performed in the system of FIG. 3 in accordance with a first exemplary trading sequence.

In FIG. 4, a block diagram illustrating a trade where a buyer wants to buy a bond in the system depicted in FIG. 3. It is further assumed that the buyer wants to buy the bond depicted in FIG. 1 and that there is a market for stripped bonds including the stripped bonds as depicted in FIGS. 2a-2f integrated in the system of FIG. 3.

First, in a step 401 the buyer sends in his bid. The bid is received by the matching system, step 403. Next the matching system tries to match the newly received order with a corresponding order stored in the orderbook, step 405. In other words in step 405 the matching process of the matching system tries to match the order to buy a bond with a corresponding order to sell such a bond. If the match is successful the process jumps to a step 417 where a deal is formed and later to a step 419 where the deal is reported back to the market.

If however there is no match between the newly received order in step 405, the process proceeds to a step 407. In the step 407 the process collects sell prices for all stripped bonds required to form the bond the for which buyer has placed an order. Next, in a step 409, the system checks if there exist prices for all required stripped bonds. If there exist prices for all such stripped bonds, the matching process tries to match that combination of stripped bonds against the received bond order. If the match is successful, the procedure proceeds to step 417 and later to step 419, as described above. If the order still cannot be matched the procedure proceeds to a step 415 where the order is stored in the orderbook of the system for matching against future orders received by the system. The step 415 is skipped if the order type is such that it does not allow storing in an orderbook.

If in the step 409, it is found that there exist prices for all required stripped bonds but one, the matching process proceeds to a step 411. In step 411 the system generates a derived order (bait) in the stripped bond market for the missing stripped bond at a price such that the combination of stripped bonds including the derived order matches the order. The matching process then proceeds to step 415 as described above. If in the step 409 it is found that there exist no prices in more than one stripped bond the matching process proceeds directly to the step 415.

Figure 5:
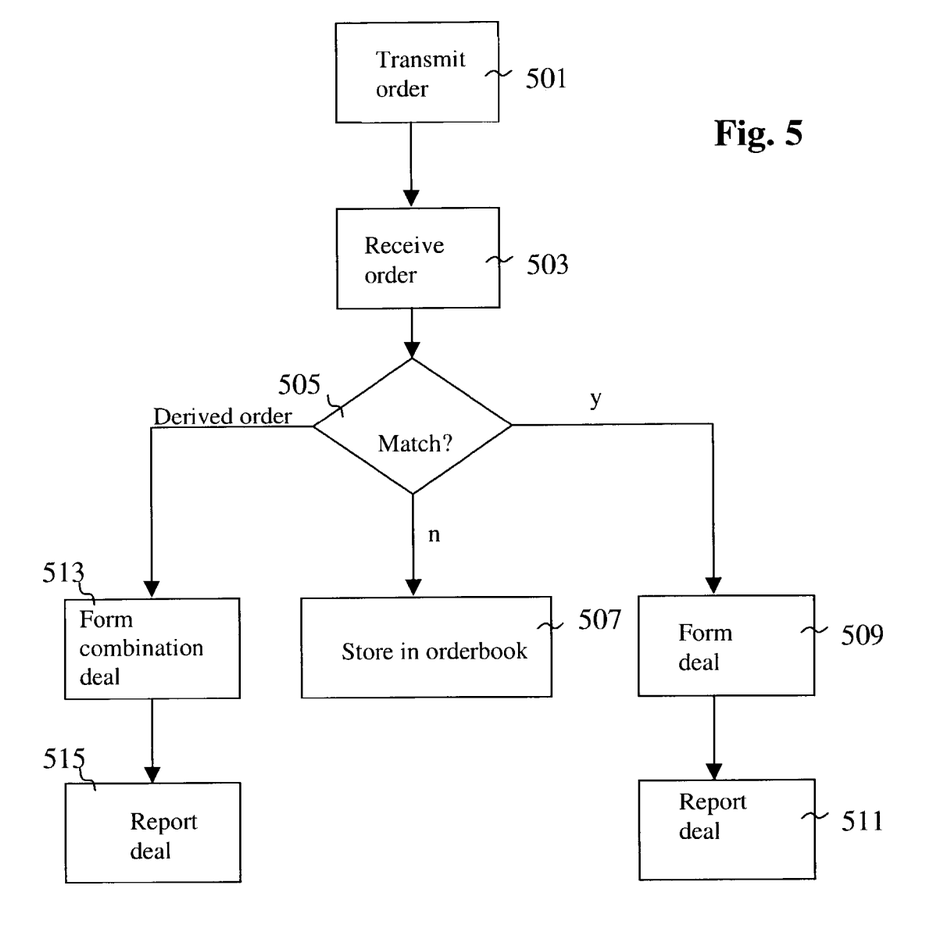
FIG. 5 is a flow chart illustrating different steps performed in the system of FIG. 3 in accordance with a second exemplary trading sequence.

In FIG. 5, another example trading sequence is depicted where it is assumed that a trader wants to sell a stripped bond in the system as depicted in FIG. 3. It is further assumed that the stripped bond is the stripped bond depicted in FIG. 2a. First, in a step 501, a trader transmits an offer to sell a stripped bond. The order to sell the stripped bond is then received by the matching system, step 503. Next in a step 505 the matching process tries to match the sell order with a corresponding buy order. The buy order can be a regular buy order, but may also be a derived order (bait) as described above in conjunction with FIG. 4 step 411. If there is no match, the matching process proceeds to a step 507 where the order is placed in the orderbook of the system, if the order type allows for this. If the matching process finds a match in step 505 and the matching order is a regular order to buy a stripped bond the process proceeds to a step 509 where a deal is formed between the seller and the buyer. The deal is subsequently reported to the market in a step 511. If the matching process finds a match in step 505 and the matching order is a derived order to buy a stripped bond the process proceeds to a step 513 where a deal is formed. The deal formed in step 513 will be a combination deal involving the selling of a number of stripped bonds and buying a bond. The combined deal is subsequently reported to the market, step 515.

The method and system as described herein integrate the trading of bonds and stripped bonds into a common market place where the prices for stripped bonds are directly reflected in the pricing of bonds, thereby creating more liquidity in the two markets. This eliminates arbitrage pricing between the two markets. Furthermore, a more user-friendly interface is created.

The invention claimed is:

1. A computer implemented trading apparatus for matching bids and offers entered by a number of traders, where fixed-income instruments paying a coupon, referred to as bonds, and fixed-income instruments not paying a coupon, referred to as stripped bonds, are traded, where for a stripped bond a coupon is split from its principal for separate trading, and where there is a relationship between bond prices and stripped bond prices, the apparatus comprising:

a matching processor having an associated memory forming one or more orderbooks wherein both fixed income instruments paying a coupon, referred to as bonds, and fixed income instruments not paying a coupon, referred to as stripped bonds, are traded, and a computer server configured to collect prices for all stripped bonds required to form a bond for which an order has been placed, and if there exists prices for all required stripped bonds except one missing stripped bond, to create a new derived order in a bond orderbook derived from one or more orders placed in a stripped bond orderbook for the one missing stripped bonds associated with the bond at a price which when combined with the collected prices matches the bond order in order to increase thereby permitting matching by the matching processor of the bond order trade matching opportunities in the bond orderbook.

2. In an automated trading system a method for matching bids and offers for fixed income instruments entered into the system by a number of traders connected to the system, the method comprising the steps of:
 receiving by a computer-implemented automated trading system from a trader a bond order to buy or sell a bond and storing the bond order in a bond orderbook, aggregating by the computer-implemented automated trading system a number of stripped bonds in a stripped bond orderbook in response to the bond order, and matching by the computer-implemented automated trading system said bond order against the aggregated number of stripped bonds which forms a bond corresponding to said bond order.

3. A method according to claim 2, further comprising matching by the computer-implemented automated trading system the bond order against bids or offers for conventional bonds.

4. A method according to claim 2, further comprising before the bond order is matched against the number of aggregated stripped bonds, checking by the computer-implemented automated trading system if there is a current price for all stripped bonds required for the match.

5. A method according to claim 4, further comprising if a price exists for all required stripped bonds but one, generating by the computer-implemented automated trading system a derived order for the missing stripped bond.

6. A method of trading stripped bonds, the method comprising the steps of:
 receiving by a computer implemented trading system a stripped bond order to buy or sell a stripped bond,
 generating by the computer implemented trading system a derived bond order based on a number of stripped bond orders,
 matching by the computer-implemented trading system said stripped bond order against existing bids or offers,
 generating by the computer-implemented trading system a derived bond order based on a number of stripped bond orders, and
 forming by the computer-implemented trading system a combination trade match between all of the number of stripped bonds required for a match against said bond order including said stripped bond order and said derived bond order.

7. A computerized trading system for trading stripped bonds, the system comprising a computer server configured to:
 receive a stripped bond order to buy or sell a stripped bond, match said stripped bond order against existing bids or offers such that when said matching occurs for a pending bid or offer resulting from a derived order generated in response to trying to match a bond order for a bond against a number of stripped bonds, a combination trade is formed between all stripped bonds required for a match against said bond order including said stripped bond order and said bond.

* * * * *